Aug. 10, 1948.  F. R. McFARLAND  2,446,942

ELASTIC ROTATIONAL SYSTEM

Filed Nov. 18, 1942

INVENTOR.
Forest R. McFarland
BY Tibbetts & Hart
Attorneys

Patented Aug. 10, 1948

2,446,942

UNITED STATES PATENT OFFICE 2,446,942

ELASTIC ROTATIONAL SYSTEM

Forest R. McFarland, Huntington Woods, Mich., assignor to Packard Motor Car Company, Detroit, Mich., a corporation of Michigan Application November 18, 1942, Serial No. 466,002

9 Claims. (Cl. 64—14)

This invention relates to elastic rotational systems and particularly to mechanism for influencing or eliminating torsional vibration in such systems.

One of the objects of the invention is to provide a simple and effective structure for varying the elasticity of an elastic rotational system through different operating speeds.

Another object of the invention is to provide a device for eliminating torsional vibration in shafts forming a part of an elastic driving system.

Another object of the invention is to provide a torsional vibration control that will automatically change the normal frequency characteristics of a rotational driving system throughout its speed range and thereby eliminate vibratory disturbances of an objectionable character.

Another object of the invention is to provide a rotational elastic driving system with a variable spring rate connector between relatively movable masses that will vary the driving stiffness therebetween as required to eliminate resonance with the disturbing forces which would otherwise result in torsional vibration.

Another object of the invention is to provide a rotational elastic system with means for eliminating objectionable torsional vibration resulting from angular acceleration of parts thereof.

Still another object of the invention is to provide a device for controlling the frequency in an elastic rotational system to maintain its relationship with the speed of rotation.

Other objects of the invention will appear from the following description taken in connection with the drawings, which form a part of this specification, in which.

Figure 1:
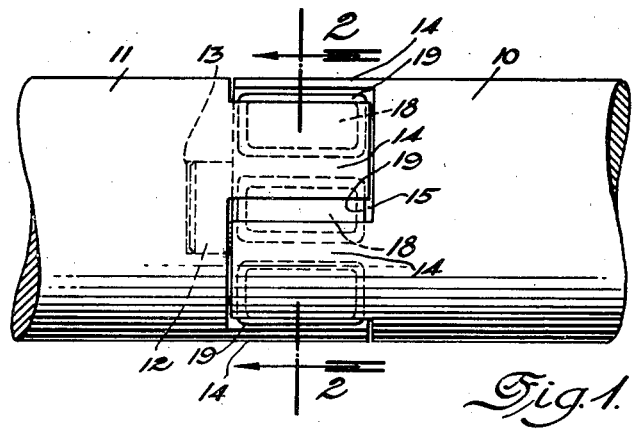
Fig. 1 is an elevational view of a shaft structure incorporating the invention.
Figure 2:
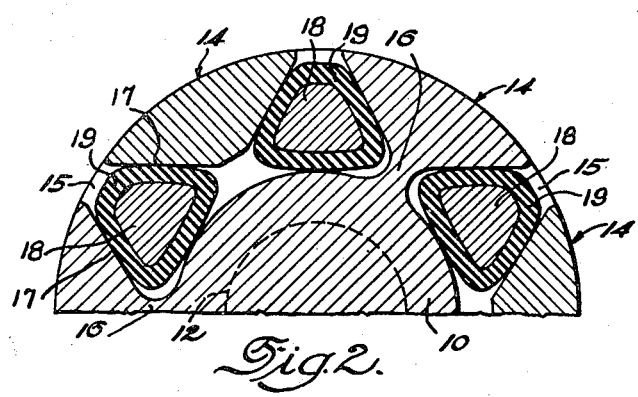
Fig. 2 is an enlarged sectional view, through the shaft structure taken on line 2—2 of Fig. 1.

A torsionally elastic system will vibrate when applied periodic forces are in synchronism with the natural frequency of the system, and this is true in driving systems having an engine crankshaft therein. At certain speeds of the shaft, called critical speeds, its natural period equals that of the power impulses or some harmonic component thereof, and this force will build up elastic energy in the shaft resulting in the production of objectionable resonance and torsional vibration of varying severity.

This torsional vibration in elastic systems has been generally recognized for some time and various devices have been used and proposed for improving such condition. Such devices usually operate as dampers and depend upon friction to prevent resonant growth of the disturbance, reducing the amplitude of the masses in the elastic system. While such known devices operate to eliminate the most objectionable disturbance in different systems, they do not eliminate or always reduce other objectionable torsional vibrations occurring within the range of operation at widely separated speeds and with considerably different intensities, and, in fact are sometimes instrumental in increasing such vibrational conditions. Ordinarily the vibrations occurring at the lower shaft speeds require the dissipation of less energy than those occurring at the higher speeds.

The present invention contemplates the use of connector means between two masses in an elastic rotational system that varies the frequency whereby it maintains its relationship with the speed of rotation.

In the drawings, there is illustrated a portion of a rotational elastic driving system in which two masses 10 and 11 are arranged to have limited relative rotation. These masses can be located in various positions in the system or they can be adjacent each other but in any event there must be connector means therebetween for the purpose of changing the natural vibrational frequency throughout the speed range making it proportional to the operating speed.

The masses in this instance are shown as drive and driven members of a shaft and alignment may be insured by providing the drive member 10 with an end extension 12 of reduced diameter that pilots in an opening 13 in the adjacent end of driven member 11. The adjacent ends of the shaft members are formed with substantially similar dogs or jaws, indicated generally by numeral 14, and the spaces 15 between the adjacent jaws of a member are considerably wider in a circumferential direction than the jaws of the other member. The shaft members are assembled by axial movement causing the jaws of the shaft members to overlap and the drive is established through connector means consisting of variable spring rate devices arranged in the spaces between alternate jaws.

The jaws on the driven member extend axially therefrom and the jaws of the drive member extend axially and are joined throughout their length by a neck 16 to a portion of the extension 12. The sides 17 of each jaw are inclined and angularly disposed relatively and they preferably converge inwardly. Thus, when adjacent jaws are interengaged, their opposing side faces will converge outwardly.

Figures 3, 4:
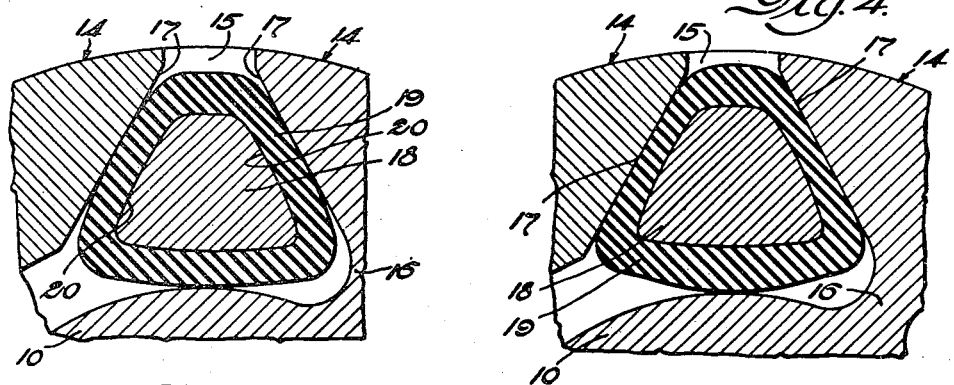
Fig. 3 is an enlarged fragmentary view of the sectional structure in Fig. 2 showing the position of an absorber when the shaft structure is rotating in a low speed range.
Fig. 4 is a view similar to Fig. 3 showing the position of the absorber when the shaft structure is in a higher speed range.

The variable spring rate connector means consists of devices having means formed of resilient material and inertia means. As a specific example, such devices can each consist of a metal weight or inertia member 18 enveloped by casing 19 formed of rubber or some material having similar characteristics. The rubber casings are preferably surface-bonded to the weight members and conform in shape thereto. The weight members are shown as substantially trapezoidal in cross section, but the form is immaterial so long as the sides 20 and the jaw sides are of a shape such that the stiffness and contacting area of the rubber casings between the jaw sides will vary upon change in the radial position of the weight members. The inertia members are of a length substantially coextensive with the jaws in an axial direction and of a cross sectional shape such that the rubber casing on the sides 20 will engage at a central portion with the sides of the jaws when at rest, as shown in Fig. 3. This can be accomplished as shown by slightly curving the sides of the weight members. The devices are retained in position by the extension 12 and by the fact that they are too large to escape between adjacent jaws when the latter are in either extreme relative position. However, the weight members 18 are free to bodily shift radially by centrifugal force as the speed of the shaft members varies.

As the weight or inertia members shift radially in response to centrifugal force they will act to change the surface area of the rubber engaging the jaw sides and also the stiffness of the connection between the driving and driven members. Thus, the spring rate of the connector means will be varied proportional to speed of rotation or relative angular movement of the associated masses. As a result, the connector devices act throughout the speed range of the masses to vary the natural frequency of the rotational system. Such variance of the natural frequency of the system is effective to eliminate resonance which would otherwise result in torsional vibration at any operating speed.

Although the invention has been described in connection with a specific embodiment, the principles involved are susceptible of numerous other applications which will readily occur to persons skilled in the art.

What is claimed is:

1. In an elastic rotational system, the combination with two masses having axially overlapping portions including outwardly converging substantially flat surfaces providing limited relative rotational movement between the masses, of connector means movable bodily in a radial direction between said outwardly converging substantially flat surfaces of the overlapping portions and having a variable spring rate, said connector means acting on said masses to vary the natural vibrational frequency of the system at different rotational speeds thereof thereby eliminating the resonance that would otherwise result in torsional vibration.

2. In an elastic rotational system, the combination with two masses having overlapping portions of wedge shaped variable spring rate connector devices between the overlapping portions for coupling said masses comprising inertia members having rubber casings.

3. A coupling for two shaft members comprising spaced overlapping jaws on the respective members, the jaws of each member having sides diverging toward the peripheries and each jaw being of less width circumferentially than the space of the other member into which it fits, weight members between the sides of alternate adjacent jaws having sides extending generally in parallel with the adjacent jaw sides, and rubber casings on the weight members engaging the jaw sides.

4. A coupling for two shaft members comprising overlapping jaws with inclined sides, said jaws fixed to said shaft members to permit limited relative rotational movement therebetween, radially shiftable weight members having curving sides arranged between the overlapping jaws, and rubber means between and engaged by the sides of the weight members and the sides of the jaws.

5. A coupling for two shaft members comprising overlapping spaced jaws fixed to the respective shaft sections, said jaws each having sides converging inwardly, weight members between adjacent jaws, said weight members having curving sides adjacent the jaw sides and extending substantially in a general parallel relation therewith, and rubber means between and engaging the weight members and the sides of the jaws.

6. A coupling for two members in a rotational elastic system comprising overlapping jaws fixed to the members, weight members between the jaws, said weight members being movable radially in response to speed, and rubber casings on the weight members engaging the sides of the jaws, said weight members applying a wedging force varying the area of the casings engaging the adjacent jaw sides proportionate to the speed of rotation of the two members in the system.

7. A coupling for two shaft sections comprising overlapping spaced jaws fixed to the shaft sections, weight members freely mounted in the spaces between the sides of the jaws, elastic casings on the weight members engaging the sides of the jaws, said weight members being movable radially in response to centrifugal force to apply a varying force and thereby control the stiffness of the coupling proportional to the speed of the shaft sections.

8. In an elastic driving system, the combination with a pair of members having overlapping jaws provided with outwardly diverging angularly related driving and driven surfaces providing limited relative rotational movement between said members, of means varying the natural vibrational frequency of the system proportional to variations of the speed of rotation comprising inertia members of trapezoidal shape in cross section having their angularly related surfaces of rounded contour, and rubber means between the inertia members and the outwardly diverging angularly related driving and driven surfaces whereby the plane of contact between the rubber means and said surfaces is displaced outwardly in proportion to increase of speed.

9. A coupling for two rotatable members comprising overlapping jaw members having substantially flat outwardly converging driving and driven contact surfaces, resilient means engaging said contact surfaces, and centrifugally actuated members associated with the resilient means to shift outwardly the contact of the resilient means with said contact surfaces of the jaw members in proportion to increase of speed.

FOREST R. McFARLAND.

REFERENCES CITED

The following references are of record in the file of this patent:

UNITED STATES PATENTS

| Number | Name | Date |
|---|---|---|
| 1,105,628 | Diemer | Aug. 4, 1914 |
| 1,304,768 | Henderson | May 27, 1919 |
| 1,504,279 | Spicer | Aug. 12, 1924 |
| 1,587,403 | Nicholson | June 1, 1926 |
| 1,688,167 | Werz | Oct. 16, 1928 |
| 1,999,364 | Lang | Apr. 30, 1935 |
| 2,005,655 | Havill | June 18, 1935 |
| 2,025,826 | Ricefield | Dec. 31, 1935 |
| 2,196,716 | Williams | Apr. 9, 1940 |

FOREIGN PATENTS

| Number | Country | Date |
|---|---|---|
| 28,910 | France | Jan. 12, 1925 |
| 524,749 | Great Britain | Aug. 14, 1940 |